United States Patent
Lim

(10) Patent No.: US 11,454,497 B2
(45) Date of Patent: Sep. 27, 2022

(54) METHOD OF MEASURING A FLATNESS OF AN OBJECT AND APPARATUS FOR PERFORMING THE SAME

(71) Applicant: Samsung Display Co., LTD., Yongin-si (KR)

(72) Inventor: Yong Woon Lim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/192,407

(22) Filed: Mar. 4, 2021

(65) Prior Publication Data

US 2021/0278204 A1    Sep. 9, 2021

(30) Foreign Application Priority Data

Mar. 6, 2020    (KR) .................... 10-2020-0028558

(51) Int. Cl.
*G01B 11/30*    (2006.01)

(52) U.S. Cl.
CPC .................. *G01B 11/306* (2013.01)

(58) Field of Classification Search
CPC    G01B 11/06; G01B 2290/70; G01B 9/02004;
G01B 9/02022; G01B 9/02056; G01B 9/02021; G01B 11/2441; G01B 11/14;
G01B 9/02007; G01B 9/02014; G01B 9/02027; G01B 9/02049; G01B 9/02068;
G01B 9/0207; G01B 9/02079; G01B 9/0209; G01B 11/03; G01B 11/306;
G01B 7/08; G01B 9/02028; G01B 9/02057; G01B 11/00; G01B 11/30;
G01B 9/02072; G01B 9/02084; G01B 11/002; G01B 11/0625; G01B 11/0675;
G01B 11/161; G01B 11/2513; G01B 21/045; G01B 2210/56; G01B 2290/25;
G01B 5/0004; G01B 5/0016; G01B 7/06; G01B 7/10; G01B 9/02003; G01B
9/02023; G01B 9/02038; G01B 9/02052; G01B 9/02058; G01B 9/02091; G01B
11/026;

(Continued)

(56) References Cited

U.S. PATENT DOCUMENTS 5,912,738 A * 6/1999 Chason ................ G01B 11/255
356/601
5,933,234 A * 8/1999 Lam ......................... G01J 3/42
356/309

(Continued)

FOREIGN PATENT DOCUMENTS

CN    104808193 A *    7/2015    ........... G01S 7/4818
CN    106289052 A *    1/2017

(Continued)

*Primary Examiner* — Michael P Stafira
(74) *Attorney, Agent, or Firm* — Kile Park Reed & Houtteman PLLC

(57) ABSTRACT

In a method of measuring a flatness of an object, a laser, which may have a wavelength reflectable from the object, may be converted into a laser array. The laser array may be irradiated to the object. The flatness of the object may be measured using a reflected laser array reflected from the object. Thus, the flatness of the object may be accurately measured to decrease process errors of a display device by correcting the flatness of the glass substrate.

21 Claims, 15 Drawing Sheets

(58) Field of Classification Search
CPC . G01B 11/0608; G01B 11/165; G01B 11/168; G01B 11/18; G01B 11/25; G01B 11/2518; G01B 11/26; G01B 15/00; G01B 21/04; G01B 21/08; G01B 2290/45; G01B 7/003; G01B 7/28; G01B 7/345; G01B 9/02; G01B 9/02031; G01B 9/02051; G01B 9/02081; G01B 11/27; G01B 2210/48; G01B 2210/62; G01B 2290/35; G01B 2290/60; G01B 9/0201; G01B 9/02069; G01B 9/02098; G01B 9/02083; G01B 9/02002; G01B 9/02067; G01B 9/02008; G01B 11/24; G01B 21/042; G01B 9/02041; G01B 11/02; G01B 9/0205; G01B 11/16; G01B 9/02078; G01B 11/005; G01B 9/02005; G01B 11/272; G01B 9/02045; G01B 9/02019; G01B 9/02059; G01B 9/02087; G01B 2290/30; G01B 9/02015; G01B 9/02039; G01B 2290/65; G01B 9/02061; G01B 9/02077; G01B 9/02075; G01B 9/02012; G01B 9/021; G01B 7/30; G01B 9/02018; G01B 9/02065; G01B 9/02092; G01B 2290/50; G01B 9/02082; G01B 11/303; G01B 2210/50; G01B 5/008; G01B 9/0203; G01B 7/14; G01B 11/255; G01B 9/02009; G01B 9/02074; G01B 9/02062; G01B 2290/15; G01B 9/02048; G01B 7/00; G01B 9/02001; G01B 9/02017; G01B 9/02076; G01B 11/22; G01B 5/004; G01B 9/02042; G01B 9/00; G01B 9/02011; G01B 9/02097; G01B 9/04; G01B 21/20; G01B 9/02032; G01B 11/0683; G01B 9/02025; G01B 9/02047; G01B 11/2531; G01B 3/30; G01B 9/02036; G01B 9/02064; G01B 9/02096; G01B 1/00; G01B 11/0616; G01B 11/08; G01B 11/254; G01B 11/2545; G01B 11/28; G01B 15/04; G01B 21/02; G01B 9/02024; G01B 9/10; G01B 11/007; G01B 11/0691; G01B 11/2433; G01B 17/02; G01B 21/16; G01B 2290/20; G01B 5/02; G01B 7/18; G01B 11/022; G01B 11/028; G01B 11/245; G01B 11/2509; G01B 21/047; G01B 3/24; G01B 5/0014; G01B 5/06; G01B 7/105; G01B 11/024; G01B 11/0658; G01B 11/2408; G01B 17/00; G01B 21/32; G01B 2290/40; G01B 5/00; G01B 5/0002; G01B 5/08; G01B 5/241; G01B 9/02029; G01B 9/02043; G01B 9/02071; G01B 9/02089; G01B 9/08; G01B 11/0641; G01B 11/2536; G01B 11/275; G01B 15/08; G01B 17/06; G01B 21/00; G01B 21/24; G01B 2210/283; G01B 2210/42; G01B 2210/44; G01B 2210/46; G01B 3/002; G01B 3/14; G01B 3/38; G01B 5/24; G01B 5/252; G01B 5/28; G01B 5/30; G01B 7/12; G01B 7/283; G01B 9/02034; G01B 9/023
See application file for complete search history.

(56) References Cited

U.S. PATENT DOCUMENTS

| | | | | |
|---|---|---|---|---|
| 6,141,136 | A * | 10/2000 | Kalibjian | G02B 5/284 398/1 |
| 6,995,848 | B2 * | 2/2006 | Deck | G01J 9/0246 356/512 |
| 9,012,875 | B2 * | 4/2015 | Shoham | G01N 21/8806 250/227.12 |
| 2004/0109167 | A1 * | 6/2004 | Sandstrom | G01B 11/14 356/519 |
| 2008/0186512 | A1 * | 8/2008 | Kee | G01B 11/25 356/615 |
| 2008/0297808 | A1 * | 12/2008 | Riza | G01B 9/02072 356/503 |
| 2011/0299094 | A1 * | 12/2011 | Dillon | G01B 11/2441 356/603 |
| 2011/0313721 | A1 * | 12/2011 | Keshavmurthy | G01B 11/2518 356/612 |
| 2012/0307258 | A1 * | 12/2012 | Koerner | G01B 9/02032 356/497 |
| 2018/0313642 | A1 * | 11/2018 | Dolgin | G01B 11/06 |
| 2019/0129312 | A1 * | 5/2019 | Hyde, IV | G01N 21/21 |

FOREIGN PATENT DOCUMENTS

| | | | | |
|---|---|---|---|---|
| CN | 109373935 | A * | 2/2019 | |
| DE | 202018106653 | U1 * | 4/2019 | G02B 27/1006 |
| JP | 2003315006 | A * | 11/2003 | |
| KR | 10-0540873 | | 1/2006 | |
| KR | 10-0752234 | | 8/2007 | |
| KR | 10-2015-0066966 | | 6/2015 | |
| KR | 10-1912293 | | 10/2018 | |
| WO | WO-2013019776 | A2 * | 2/2013 | G01B 9/0209 |

\* cited by examiner

FIRST
VERTICAL
DIRECTION

METHOD OF MEASURING A FLATNESS OF AN OBJECT AND APPARATUS FOR PERFORMING THE SAME

CROSS REFERENCE TO RELATED APPLICATION(S)

This application claims priority to and benefits of Korean Patent Application No. 10-2020-0028558 under 35 U.S.C. § 119, filed in the Korean Intellectual Property Office (KIPO) on Mar. 6, 2020, the entire contents of which are incorporated herein by reference.

BACKGROUND

1. Technical Field

Example embodiments relate to a method of measuring a surface flatness of a glass substrate, and an apparatus for performing the method.

2. Description of the Related Art

A glass substrate used for a display device may require a certain degree of flatness. In case that the glass substrate may have a low degree of flatness, layers on the glass substrate may have uneven thicknesses. The layers having uneven thicknesses may cause process errors.

Therefore, it may be required for a method and an apparatus to accurately measure the flatness of the glass substrate and the layers.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Example embodiments may provide a method of accurately measuring a flatness of an object.

Example embodiments may also provide an apparatus for performing the above-mentioned method.

According to example embodiments, there may be provided a method of measuring a flatness of an object. The method of measuring the flatness of the object may include converting a laser, which may have a wavelength reflectable from the object, into a laser array, irradiating the laser array to the object, and measuring the flatness of the object using a reflected laser array reflected from the object.

In example embodiments, the measuring of the flatness of the object may include measuring reflectivities by positions of the object using the reflected laser array, and obtaining thicknesses by the positions of the object from the reflectivities.

In example embodiments, the measuring of the flatness of the object may further include measuring stresses by the positions of the object using the reflected laser array.

In example embodiments, the method may further include comparing the stresses by the positions of the object with stresses by positions of a reference object to obtain actual stresses by the positions of the object.

In example embodiments, the method may further include filtering the laser before the converting of the laser into the laser array.

In example embodiments, the object may include a glass substrate or at least one layer on a glass substrate.

According to example embodiments, there may be provided an apparatus for measuring a flatness of an object. The apparatus may include a laser source, an etalon interferometer, and an analyzer. The laser source may be disposed over the object to generate a laser having a wavelength reflectable from the object. The etalon interferometer may be disposed between the object and the laser source to convert the laser into a laser array irradiated to the object. The analyzer may be disposed over the object to measure the flatness of the object using a reflected laser array reflected from the object.

In example embodiments, the laser source may be disposed at a position different from a position of the object such that the laser source is disposed in a second vertical direction that is substantially parallel with a first vertical direction that passes through the object. The laser source may generate the laser along the second vertical direction.

In example embodiments, the apparatus may further include a beam splitter disposed between the etalon interferometer and the object to induce the laser array from the second vertical direction to the first vertical direction.

In example embodiments, the analyzer may be positioned in the first vertical direction.

In example embodiments, the apparatus may further include a filter disposed between the laser source and the etalon interferometer to filter the laser.

In example embodiments, the laser source may be disposed at a position inclined to a surface of the object along a first direction. The analyzer may be disposed at a position inclined to the surface of the object along a second direction opposite to the first direction.

In example embodiments, the analyzer may measure reflectivities by positions of the object using the reflected laser array. The analyzer may obtain thicknesses by the positions of the object from the reflectivities.

In example embodiments, the analyzer may measure stresses by the positions of the object using the reflected laser array.

In example embodiments, the analyzer may compare stresses by the positions of the object with stresses by positions of a reference object to obtain actual stresses by the positions of the object.

In example embodiments, the analyzer may include an optical sensor that receives the reflected laser array.

In example embodiments, the object may include a glass substrate or at least one layer on a glass substrate.

According to example embodiments, there may be provided an apparatus for measuring a flatness of a substrate. The apparatus may include a laser source, an etalon interferometer, a beam splitter, and an analyzer. The laser source may be disposed at a position different from a position of the object such that the laser source is disposed in a second vertical direction that is substantially parallel with a first vertical direction that passes through the substrate. The laser source may generate a laser, which has a wavelength reflectable from the substrate, along the second vertical direction. The etalon interferometer may be disposed between the substrate and the laser source in the second vertical direction to convert the laser into a laser array. The beam splitter may be disposed between the etalon interferometer and the substrate to induce the laser array from the second vertical direction to the first vertical direction. The analyzer may be disposed over the substrate in the first vertical direction to receive a reflected laser array reflected from the substrate and to measure the flatness of the substrate using the reflected laser array.

In example embodiments, the analyzer may measure reflectivities and stresses by positions of the substrate using the reflected laser array to obtain thicknesses of the positions of the substrate from the reflectivities. The analyzer may compare the stresses by the positions of the substrate with stresses by positions of a reference substrate to obtain actual stresses by the positions of the substrate.

According to example embodiments, the laser having a wavelength reflectable from a material of the object may be generated. Flatness of the object may be measured using a laser array reflected from the object. Further, reflectivities and stresses by the positions of the object may be measured using a reflected laser array to obtain thicknesses by the positions of the object. Particularly, the flatness and a thickness deviation may be simultaneously obtained from the stresses measured at a same position on the object, for example, a same position at which a deformation may be generated. Thus, flatness of the object such as the glass substrate may be accurately measured to decrease process errors of a display device by correcting the flatness of the glass substrate.

BRIEF DESCRIPTION OF THE DRAWINGS

Example embodiments will be more clearly understood from the following detailed description taken in conjunction with the accompanying drawings.

FIG. 1 is a view schematically illustrating an apparatus for measuring a flatness of an object in accordance with example embodiments;

FIG. 2 is a view schematically illustrating a laser array analyzed by an analyzer of the apparatus in FIG. 1;

FIGS. 3 to 5 are views schematically illustrating reflectivities of a laser in accordance with flatnesses of a glass substrate;

FIG. 6 is a view schematically illustrating a stress distribution of a glass substrate measured by the apparatus in FIG. 1;

FIG. 7 is a view schematically illustrating a stress distribution of a reference glass substrate;

FIG. 8 is a view schematically illustrating actual stresses by positions of a glass substrate obtained from the stress distributions in FIGS. 6 and 7;

FIGS. 9 to 15 are views schematically illustrating various objects to which the apparatus in FIG. 1 may be applied;

FIG. 16 is a flow chart schematically illustrating a method of measuring a flatness of a glass substrate using the apparatus in FIG. 1;

FIG. 17 is a view schematically illustrating an apparatus for measuring a flatness of an object in accordance with example embodiments; and FIG. 18 is a view schematically illustrating an apparatus for measuring a flatness of an object in accordance with example embodiments.

DETAILED DESCRIPTION OF THE EMBODIMENTS

Figure 1:
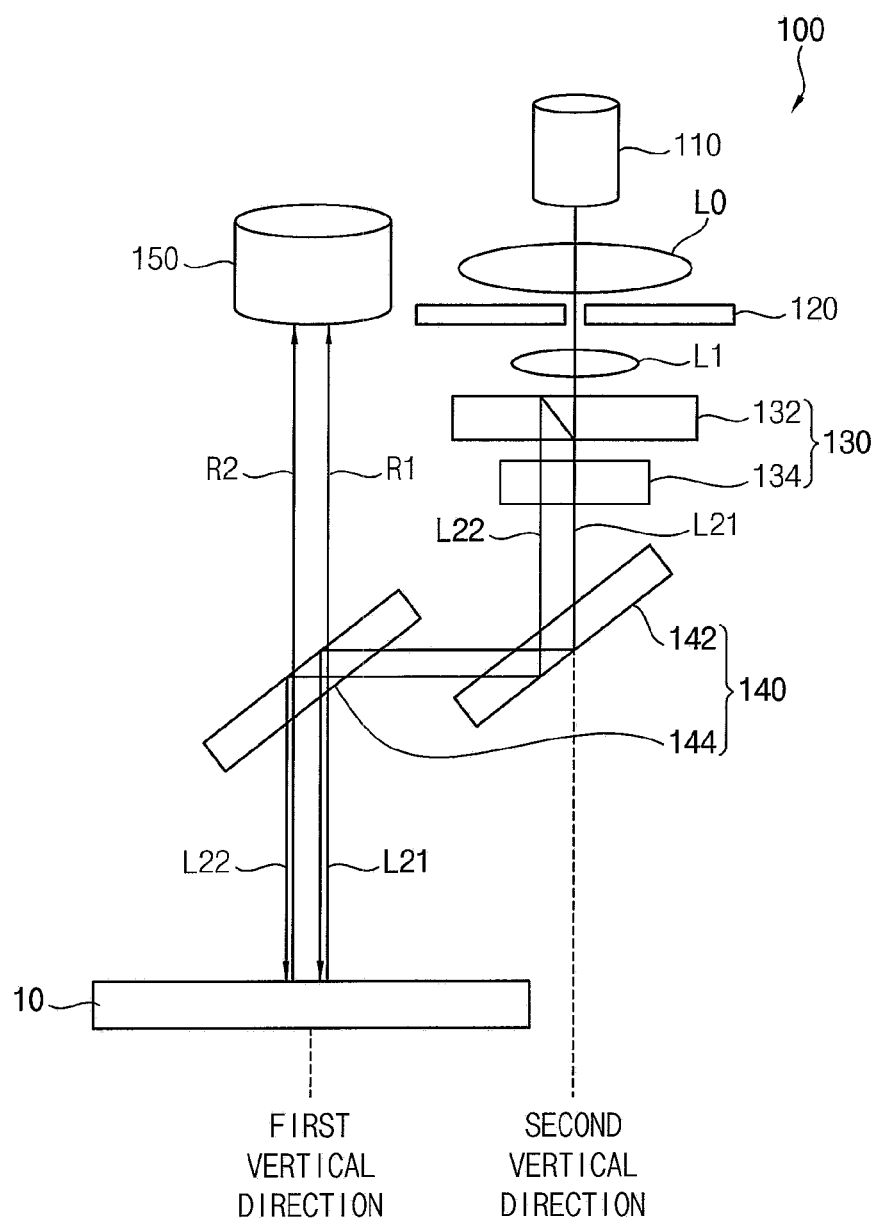
FIGS. 1 to 18 represent non-limiting, example embodiments as described herein.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there may be no intervening elements or layers present. Like or similar reference numerals refer to like or similar elements throughout. As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The phrase "at least one of" is intended to include the meaning of "at least one selected from the group of" for the purpose of its meaning and interpretation. For example, "at least one of A and B" may be understood to mean "A, B, or A and B."

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that terms such as "comprises," "comprising," "has," "having," "includes," and/or "including" when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view schematically illustrating an apparatus for measuring a flatness of an object in accordance with example embodiments.

Referring to FIG. 1, an apparatus 100 of measuring a flatness of an object in accordance with example embodiments may include a laser source 110, a filter 120, an etalon interferometer 130, a beam splitter 140 and an analyzer 150.

The apparatus 100 of example embodiments may be applied to a glass substrate 10 as one example of the object. Particularly, the glass substrate 10 may include a bare glass substrate on which any layer may not be formed. The apparatus 100 may measure thicknesses by positions of the glass substrate 10 to obtain the flatness of the glass substrate 10. The glass substrate 10 may be horizontally disposed. A first vertical direction may pass through an upper surface of the glass substrate 10. The first vertical direction may be substantially perpendicular to the upper surface of the glass substrate 10. For example, the first vertical direction may vertically pass through the glass substrate 10.

The laser source 110 may be disposed over the glass substrate 10. In example embodiments, the laser source 110 may be positioned on a second vertical direction. The second vertical direction may be substantially parallel to the first vertical direction. However, the second vertical direction may not pass through the upper surface of the glass substrate 10. The laser source 110 may downwardly generate a laser L0 toward the glass substrate 10 along the second vertical direction. Particularly, the laser L0 may have a wavelength selected in accordance with a material of the object. For example, in case that the object may include the glass substrate 10, the laser source 110 may generate the laser L0 having the wavelength reflectable from a glass material of the glass substrate 10.

The filter 120 may be disposed between the laser source 110 and the glass substrate 10 on the second vertical direction. The filter 120 may filter the laser L0 generated from the laser source 110 to remove noises in the laser L0. Thus, the laser L0 passing through the filter 120 may be converted into a filtered laser L1.

The etalon interferometer 130 may be disposed between the filter 120 and the glass substrate 10 on the second vertical direction. The etalon interferometer 130 may convert the filtered laser L1 into a laser array L21 and L22. The laser array L21 and L22 may have a structure in which at least two lasers may be disposed. For example, the laser array L21 and L22 may have a structure in which two lasers may be disposed.

For example, in case that the filtered laser L1 may pass through the etalon interferometer 130, the filtered laser L1 may be divided into two directions substantially perpendicular to each other to form the laser array L21 and L22. The laser array L21 and L22 converted by the etalon interferometer 130 may have a two-dimensional structure or a three-dimensional structure. Further, the laser array L21 and L22 converted by the etalon interferometer 130 may have a parallel structure or a slant structure.

The etalon interferometer 130 may include a first etalon 132 and a second etalon 134. The first etalon 132 may be disposed under the filter 120 on the second vertical direction. The second etalon 134 may be disposed under the first etalon 132 on the second vertical direction.

The beam splitter 140 may be configured to induce the laser array L21 and L22, which may be formed by the etalon interferometer 130, to the upper surface of the glass substrate 10. For example, the beam splitter 140 may induce the laser array L21 and L22 on the second vertical direction to the first vertical direction. The beam splitter 140 may include a first splitter 142 and a second splitter 144.

The first splitter 142 may be disposed under the second etalon 134 on the second vertical direction. Further, the first splitter 142 may be disposed inclined to the second vertical direction. The first splitter 142 may horizontally reflect the laser array L21 and L22 on the second vertical direction to the first vertical direction.

The second splitter 144 may be disposed over the glass substrate 10 on the first vertical direction. The second splitter 144 may be disposed inclined to the first vertical direction. Particularly, the second splitter 144 may be positioned on a horizontal plane on which the first splitter 142 may be positioned. For example, the first splitter 142 and the second splitter 144 may be substantially coplanar with each other. As another example, the second splitter 144 may be positioned on the horizontal plane higher or lower than the horizontal plane on which the first splitter 142 may be positioned. Thus, the laser array L21 and L22 reflected from the first splitter 142 may be incident to the second splitter 144. The second splitter 144 may vertically reflect the laser array L21 and L22 toward the upper surface of the glass substrate 10. Therefore, the laser array L21 and L22 may be vertically incident to the upper surface of the glass substrate 10.

The analyzer 150 may be disposed over the glass substrate 10 on the first vertical direction. Particularly, the analyzer 150 may be disposed over the second splitter 144. The analyzer 150 may receive a laser array R1 and R2 (e.g., a reflected laser array) reflected from the upper surface of the glass substrate 10. Thus, the analyzer 150 may include an optical sensor configured to receive the laser array R1 and R2.

As another example, the analyzer 150 may not be positioned on the first vertical direction. For example, the analyzer 150 may be positioned on the second vertical direction. Further, in case that the glass substrate 10 may have a large area, the laser source 110, the filter 120, the etalon interferometer 130 and the first splitter 142 may be positioned on the first vertical direction. The second direction may pass through the glass substrate 10. However, the first vertical direction and the second vertical direction may pass through different positions through the glass substrate 10.

The apparatus 100 may further include other optical members such as a splitter, a mirror, etc.

Figure 2:
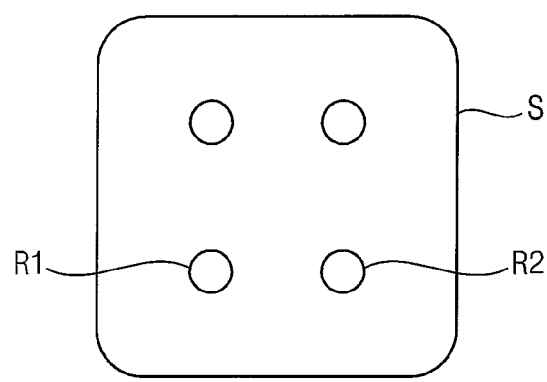

FIG. 2 is a view schematically illustrating a laser array analyzed by an analyzer of the apparatus in FIG. 1.

Referring to FIG. 2, the laser array R1 and R2 received in the analyzer 150 may have a (2×2) matrix shape. However, the laser array R1 and R2 received in the analyzer 150 may have at least a (3×3) matrix shape. The laser array R1 and R2 may be positioned in one irradiation region S. The irradiation region S may correspond to a portion of the glass substrate to which the laser array L21 and L22 may be incident.

The glass substrate 10 or a layer on the glass substrate 10 may have a thickness distribution. The thickness distribution may be generated by a size and a position of a target on the glass substrate 10 or the layer, a position on the glass substrate 10 or the layer on which processes such as a sputtering process or a chemical vapor deposition (CVD) process, may be performed, etc. Further, different stresses may be generated at positions on the glass substrate 10 or the layer due to materials and/or warpage of the glass substrate 10 or the layer on which the processes may be performed.

The analyzer 150 may measure reflectivities by the positions of the glass substrate 10 using the laser array R1 and R2. Further, the analyzer 150 may obtain thicknesses by the positions of the glass substrate 10 from the reflectivities by the positions of the glass substrate 10. Particularly, the analyzer 150 may measure stresses by the positions of the glass substrate 10 using the laser array R1 and R2. The stresses by the positions of the glass substrate 10 may be differently generated at the positions of the glass substrate 10 due to a deformation of the glass substrate 10 caused by the materials and/or the warpage of the glass substrate 10. The analyzer 150 may compare the stresses by the positions of the glass substrate 10 with stresses by positions of a reference glass substrate to obtain actual stresses by the positions of the glass substrate 10. For example, the analyzer 150 may subtract the stresses by the positions of the reference glass substrate from the stresses by the positions of the glass substrate 10 to obtain the actual stresses by the positions of the glass substrate 10. Here, the reference glass substrate may have a flat surface without a curved portion.

Figure 3:
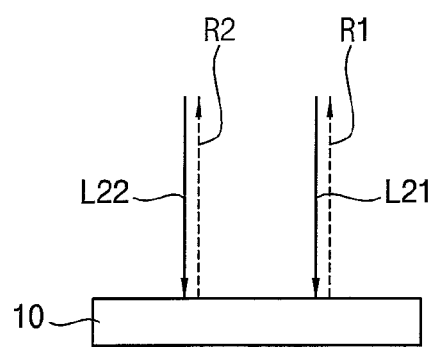
Figure 4:
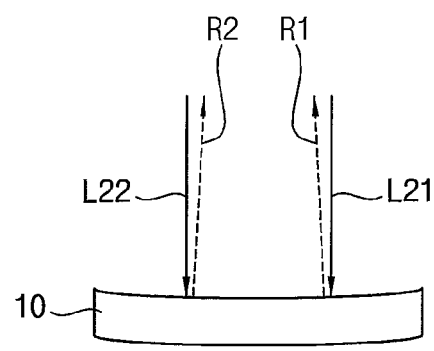
Figure 5:
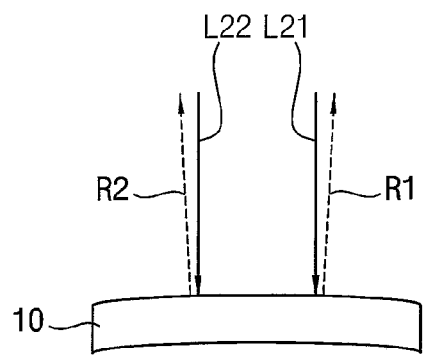

FIGS. 3 to 5 are views schematically illustrating reflectivities of a laser in accordance with flatnesses of a glass substrate.

Referring to FIG. 3, in case that the laser array R1 and R2 reflected from a portion of the surface of the glass substrate 10 may be progressed in a direction substantially parallel to the incident direction of the laser array L21 and L22 incident to the glass substrate 10, the analyzer 150 may analyze the laser array R1 and R2 to interpret the portion of the glass substrate 10 as a flat surface. Further, because the portion of the glass substrate 10 may have the flat surface, a stress of the portion on the glass substrate 10 measured by the analyzer 150 may be substantially the same as a stress of a corresponding portion on the reference glass substrate.

In contrast, referring to FIG. 4, in case that the laser array R1 and R2 reflected from a portion of the surface of the glass substrate 10 may be progressed in a direction inwardly slanted relative to the incident direction of the laser array L21 and L22 incident to the glass substrate 10, the analyzer 150 may analyze the laser array R1 and R2 to interpret the portion of the glass substrate 10 as a downwardly bent surface. Further, because the portion of the glass substrate 10 may have the downwardly bent surface, a stress of the portion on the glass substrate 10 measured by the analyzer 150 may be different from a stress of a corresponding portion on the reference glass substrate. For example, a tensile stress may be generated at the downwardly bent surface of the glass substrate 10.

Further, referring to FIG. 5, in case that the laser array R1 and R2 reflected from a portion of the surface of the glass substrate 10 may be progressed in a direction outwardly slanted relative to the incident direction of the laser array L21 and L22 incident to the glass substrate 10, the analyzer 150 may analyze the laser array R1 and R2 to interpret the portion of the glass substrate 10 as an upwardly bent surface. Further, because the portion of the glass substrate 10 may have the upwardly bent surface, a stress of the portion on the glass substrate 10 measured by the analyzer 150 may be different from a stress of a corresponding portion on the reference glass substrate. For example, a compressive stress may be generated at the upwardly bent surface of the glass substrate 10.

Therefore, the glass substrate 10 or the layer may have an uneven flatness due to a local deformation. The uneven flatness may be caused by a thickness distribution of the glass substrate 10, a thickness distribution of the layer and/or the stresses including a warpage deformation related to the materials of the glass substrate 10 and/or the layer and a temperature. In order to remove noises caused by the thickness distribution of the glass substrate 10 or the layer, the analyzer 150 may simultaneously obtain the flatness and the thickness deviation from the stresses measured at the same portion on the glass substrate 10 or the layer, for example, at the same portion at which the deformation may be generated.

Figure 6:
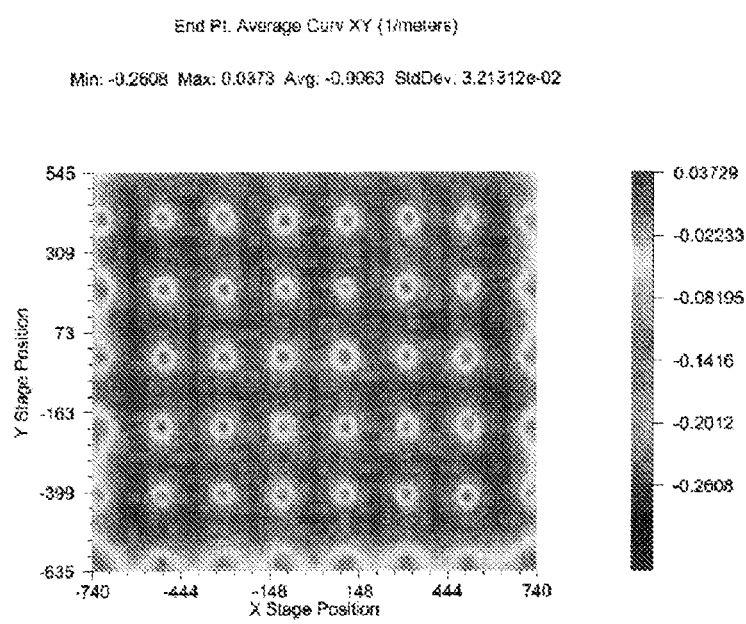
Figure 7:
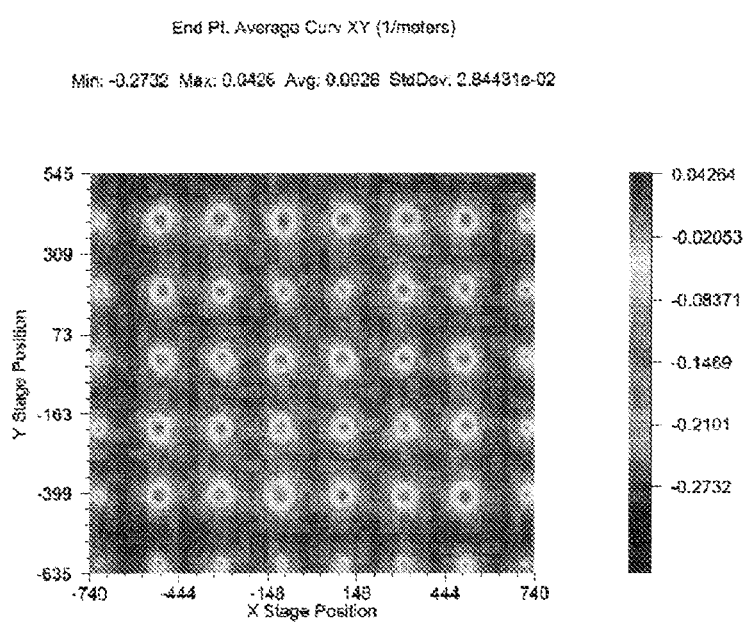
Figure 8:
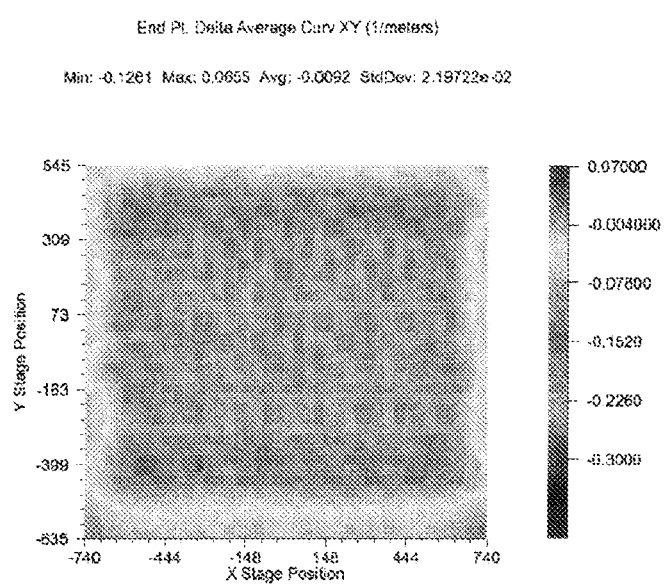

FIG. 6 is a view schematically illustrating a stress distribution of a glass substrate measured by the apparatus in FIG. 1, FIG. 7 is a view schematically illustrating a stress distribution of a reference glass substrate, and FIG. 8 is a view schematically illustrating actual stresses by positions of a glass substrate obtained from the stress distributions in FIGS. 6 and 7.

Referring to FIG. 6, the analyzer 150 may analyze the laser array R1 and R2 reflected from the glass substrate 10 to measure the stresses by the positions of the glass substrate 10.

The stresses by the positions of the reference glass substrate having the flat surface in FIG. 7 may be inputted into the analyzer 150.

The analyzer 150 may compare the stresses by the positions of the glass substrate 10 in FIG. 6 with the stresses by the positions of the reference glass substrate in FIG. 7 to obtain the actual stresses by the positions of the glass substrate 10 in FIG. 8. For example, the analyzer 150 may subtract the stresses by the positions of the reference glass substrate in FIG. 7 from the stresses by the positions of the glass substrate 10 in FIG. 6 to obtain the actual stresses by the positions of the glass substrate 10 in FIG. 8.

FIGS. 9 to 15 are views schematically illustrating various objects to which the apparatus in FIG. 1 may be applied.

Figure 9:
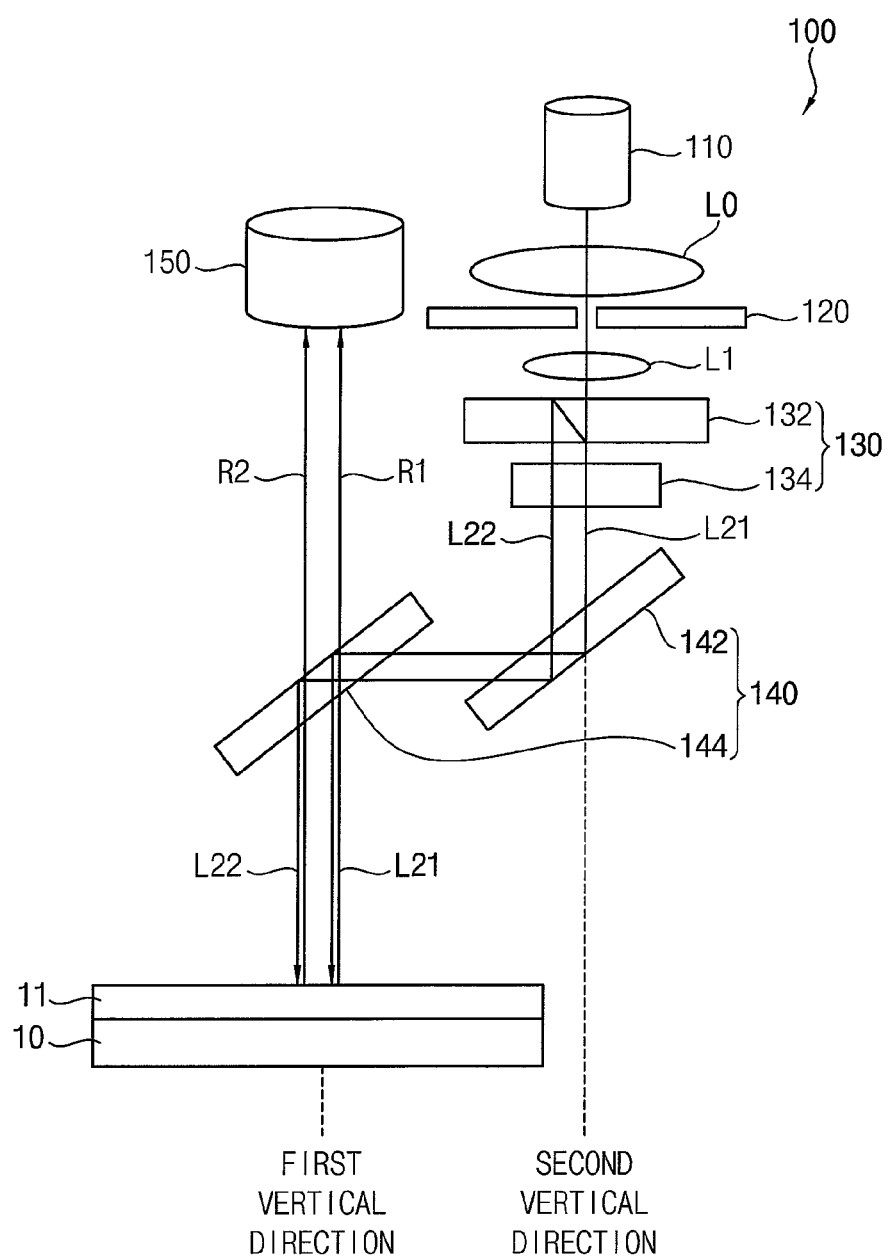

Referring to FIG. 9, the apparatus 100 in FIG. 1 may be applied to a polysilicon layer 11 on the glass substrate 10 to measure a flatness of the polysilicon layer 11. Particularly, the laser source 110 may generate a laser having a wavelength reflectable from polysilicon in the polysilicon layer 11.

Figure 10:
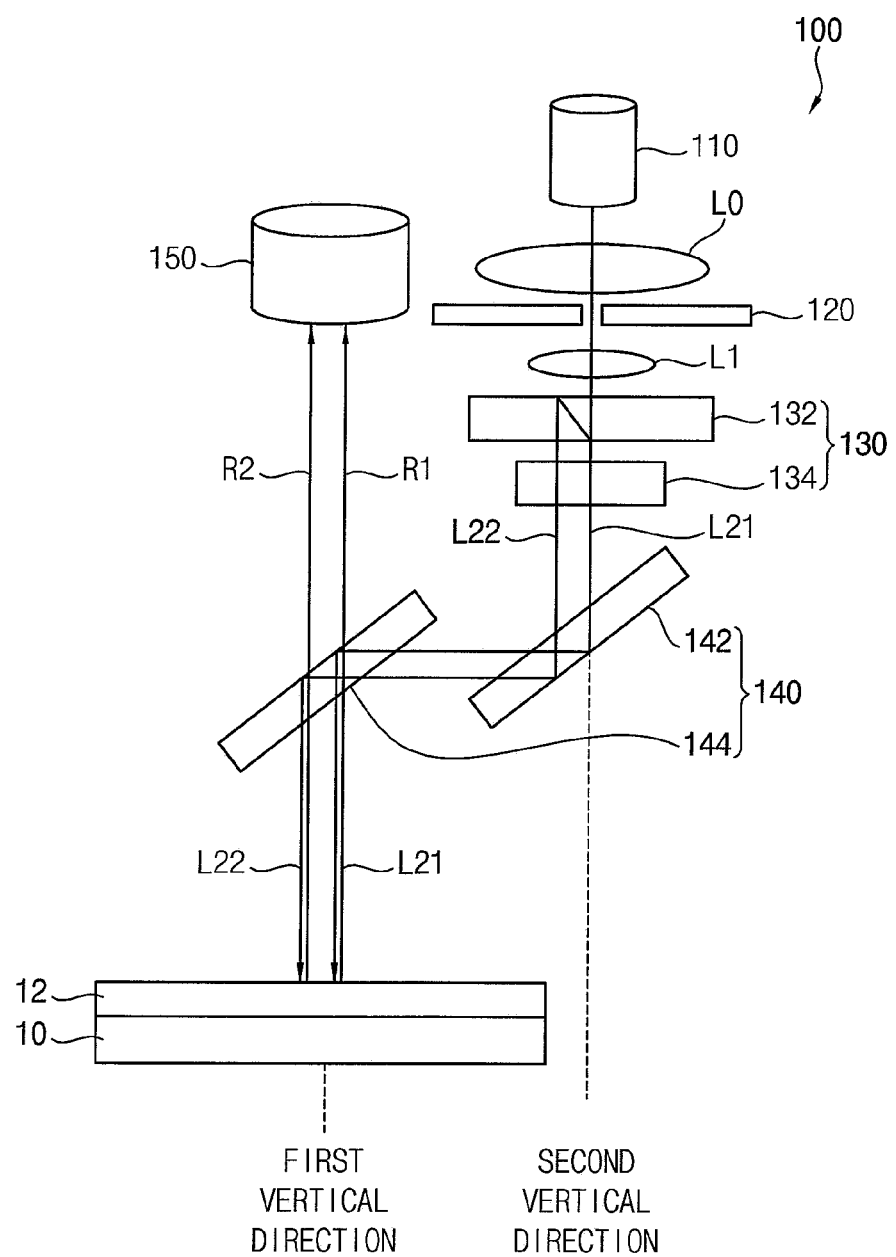

Referring to FIG. 10, the apparatus 100 in FIG. 1 may be applied to a crystalline polysilicon layer 12 formed by crystallizing the polysilicon layer 11 in FIG. 9 to measure a flatness of the crystalline polysilicon layer 12. Particularly, the laser source 110 may generate a laser having a wavelength reflectable from crystalline polysilicon in the crystalline polysilicon layer 12.

Figure 11:
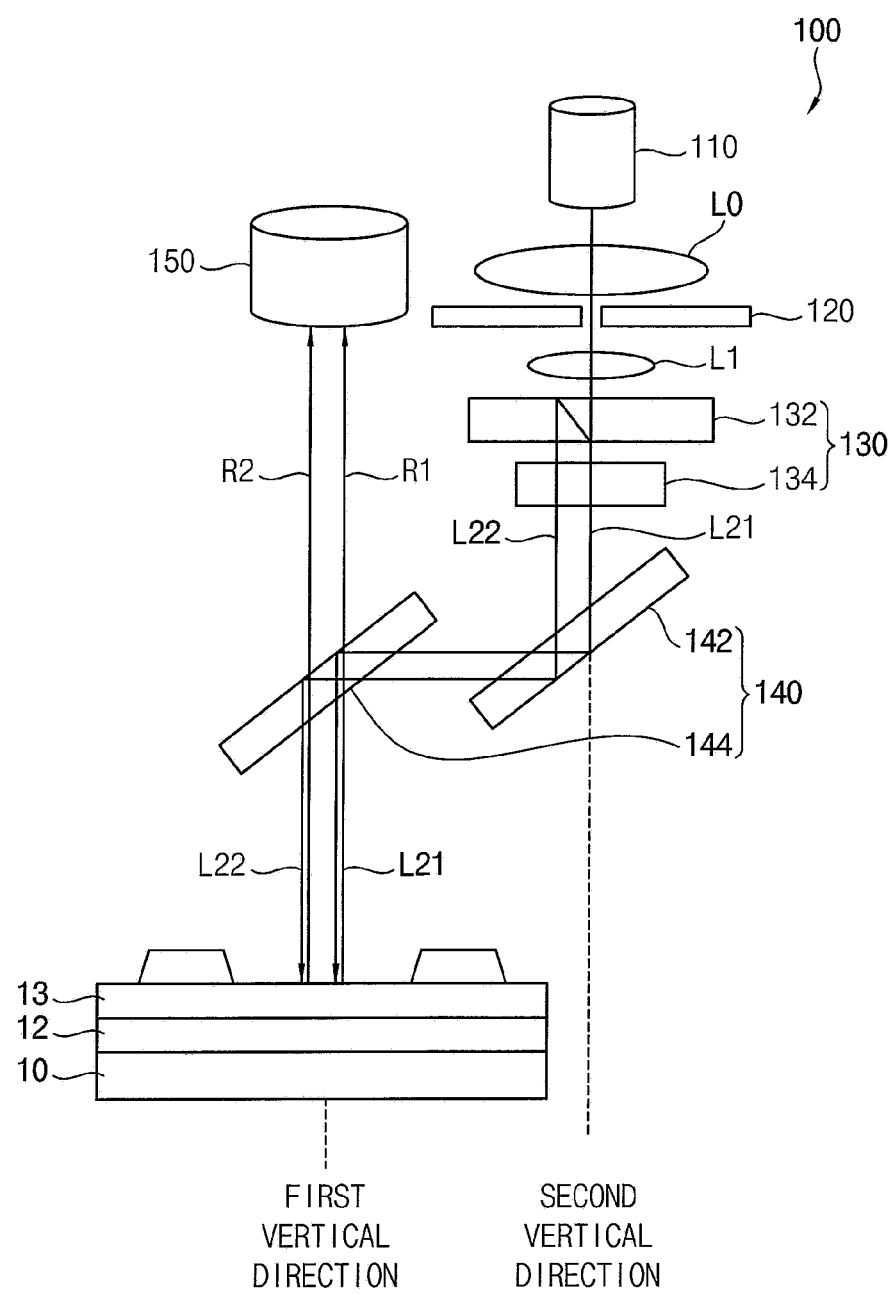

Referring to FIG. 11, the apparatus 100 in FIG. 1 may be applied to an active layer 13 on the crystalline polysilicon layer 12 of FIG. 10 to measure a flatness of the active layer 13. Particularly, the laser source 110 may generate a laser having a wavelength reflectable from a material in the active layer 13.

Figure 12:
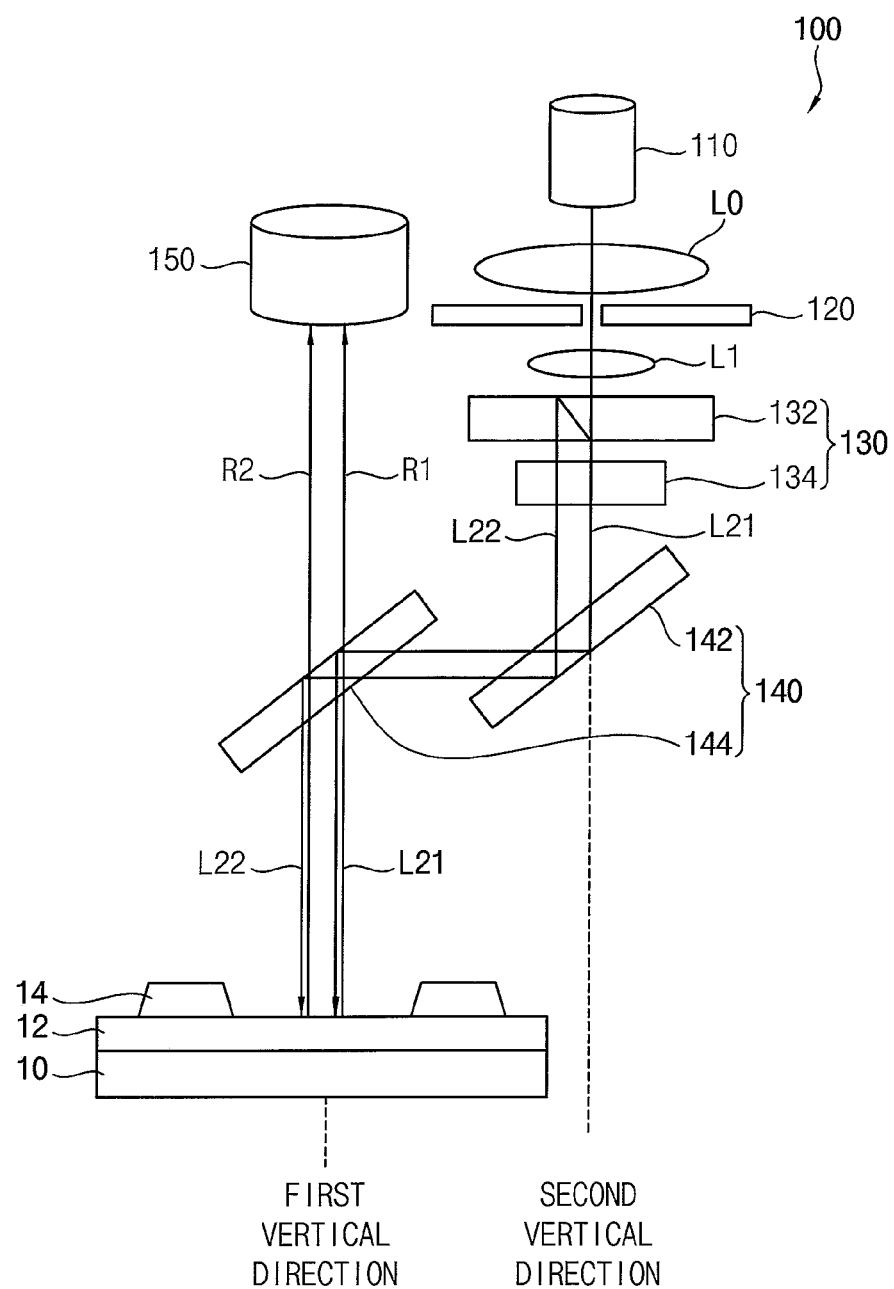

Referring to FIG. 12, the apparatus 100 in FIG. 1 may be applied to an active pattern 14 formed by patterning the active layer of 13 FIG. 11 to measure a flatness of the active pattern 14. Particularly, the laser source 110 may generate a laser having a wavelength reflectable from a material in the active pattern 14.

Figure 13:
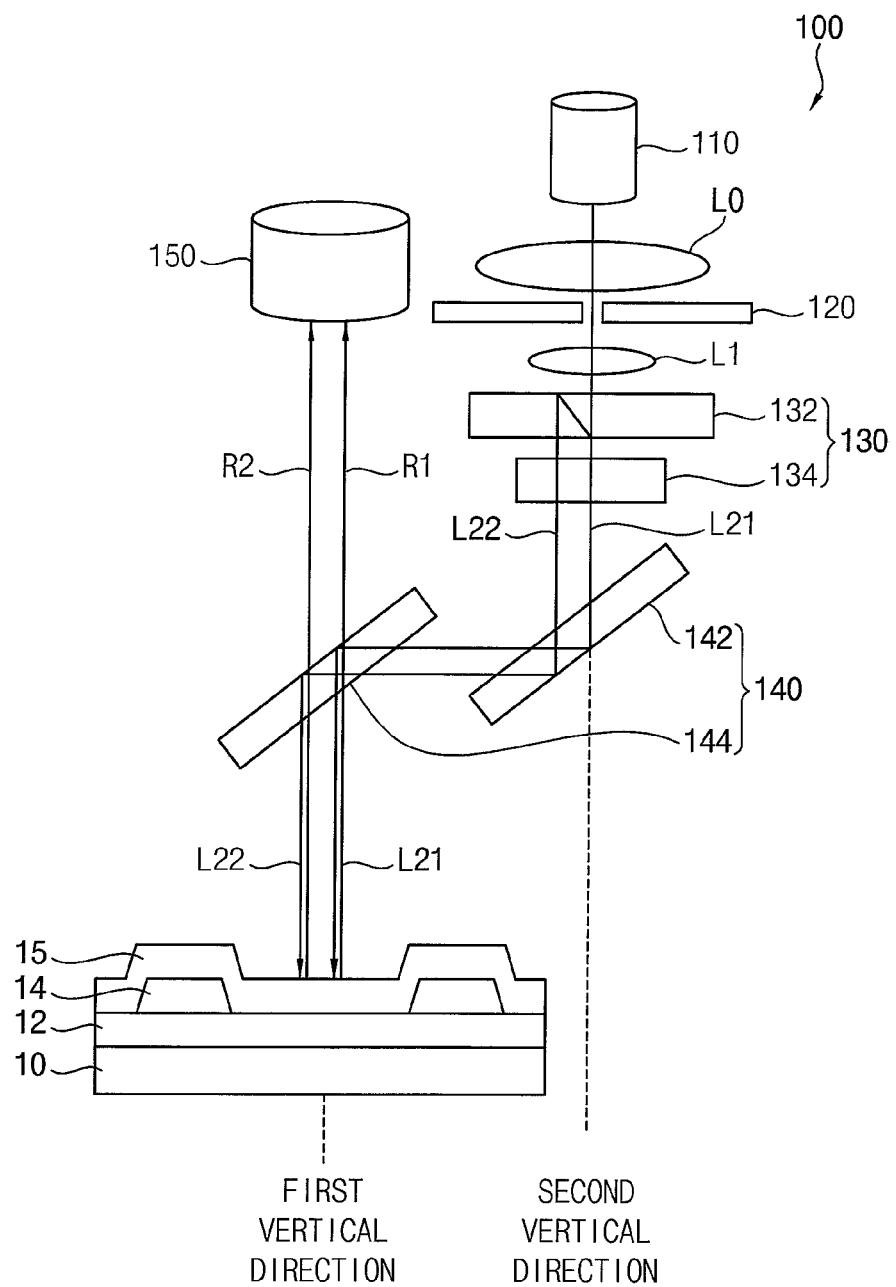

Referring to FIG. 13, the apparatus 100 in FIG. 1 may be applied to a GI1 (first gate insulation layer) 15 on the active pattern 14 in FIG. 12 to measure a flatness of the GI1 15. Particularly, the laser source 110 may generate a laser having a wavelength reflectable from a material in the GI1 15.

Figure 14:
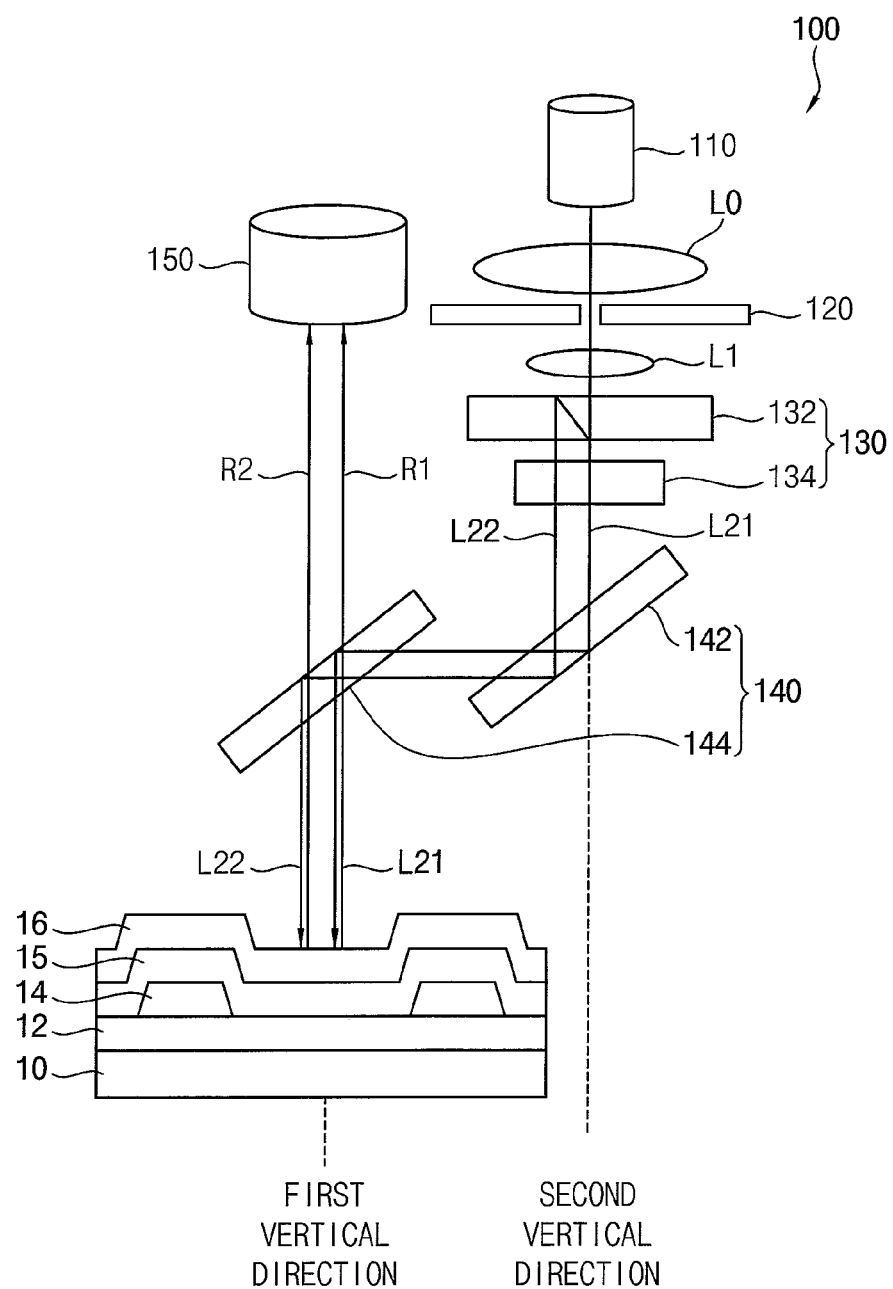

Referring to FIG. 14, the apparatus 100 in FIG. 1 may be applied to a GAT1 (first gate 16 on the GI1 15 in FIG. 13 to measure a flatness of the GAT1 16. Particularly, the laser source 110 may generate a laser having a wavelength reflectable from a material in the GAT1 16.

Figure 15:
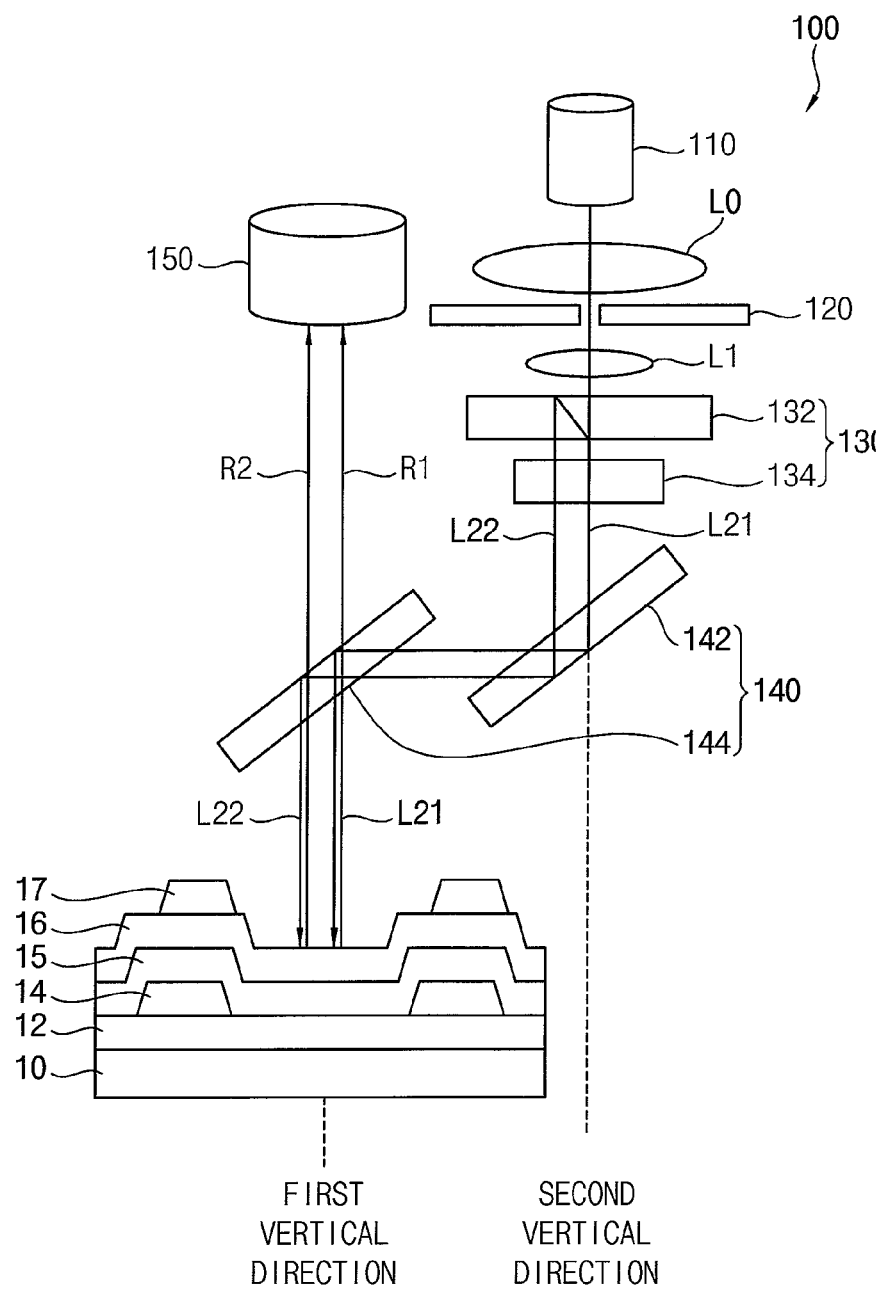

Referring to FIG. 15, the apparatus 100 in FIG. 1 may be applied to a photoresist pattern 17 on the GAT1 16 in FIG. 14 to measure a flatness of the photoresist pattern 17. Particularly, the laser source 110 may generate a laser having a wavelength reflectable from a material in the photoresist pattern 17.

Figure 16:
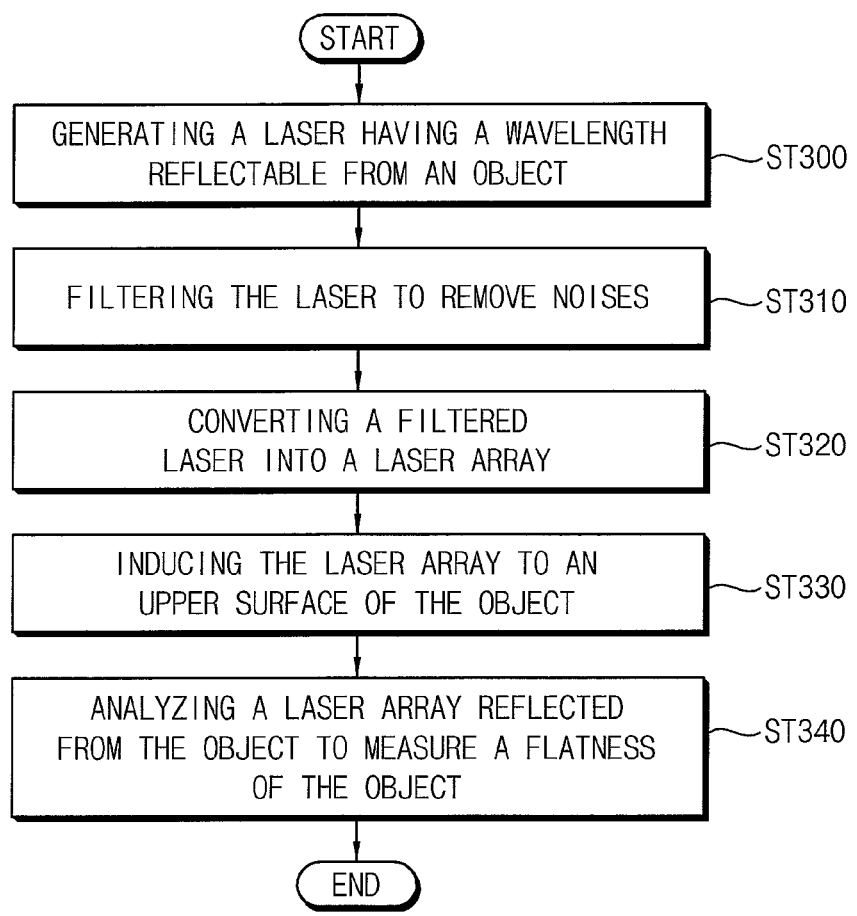

FIG. 16 is a flow chart schematically illustrating a method of measuring a flatness of a glass substrate using the apparatus in FIG. 1.

Referring to FIGS. 1 and 16, in step ST300, the laser source 110 may generate the laser L0 having the wavelength reflectable from the glass substrate 10.

In step ST310, the filter 120 may filter the laser L0 to remove the noises from the laser L0. Thus, the laser L0 passing through the filter 120 may be converted into the filtered laser L1.

In step ST320, the etalon interferometer 130 may convert the filtered laser L1 into the laser array L21 and L22.

In step ST330, the beam splitter 140 may induce the laser array L21 and L22 formed by the etalon interferometer 130 to the upper surface of the glass substrate 10. Particularly, the first splitter 142 may horizontally reflect the laser array L21 and L22 on the second vertical direction to the first vertical direction. The second splitter 144 may reflect the laser array L21 and L22 toward the upper surface of the glass substrate 10 along the first vertical direction. Thus, the laser array L21 and L22 may be vertically incident to the upper surface of the glass substrate 10.

In step ST340, the analyzer 150 may receive the laser array R1 and R2 (e.g., reflected laser array) reflected from the upper surface of the glass substrate 10. The analyzer 150 may measure the reflectivities by the positions of the glass substrate 10 using the laser array R1 and R2. Further, the analyzer 150 may obtain the thicknesses by the positions of the glass substrate 10 from the reflectivities by the positions of the glass substrate 10. Particularly, the analyzer 150 may measure the stresses by the positions of the glass substrate 10 using the laser array R1 and R2. Further, the analyzer 150 may compare the stresses by the positions of the glass substrate 10 with the stresses by the positions of the reference glass substrate to obtain the actual stresses by the positions of the glass substrate 10. For example, the analyzer 150 may subtract the stresses by the positions of the reference glass substrate in FIG. 7 from the stresses by the positions of the glass substrate 10 in FIG. 6 to obtain the actual stresses by the positions of the glass substrate 10 in FIG. 8.

Figure 17:
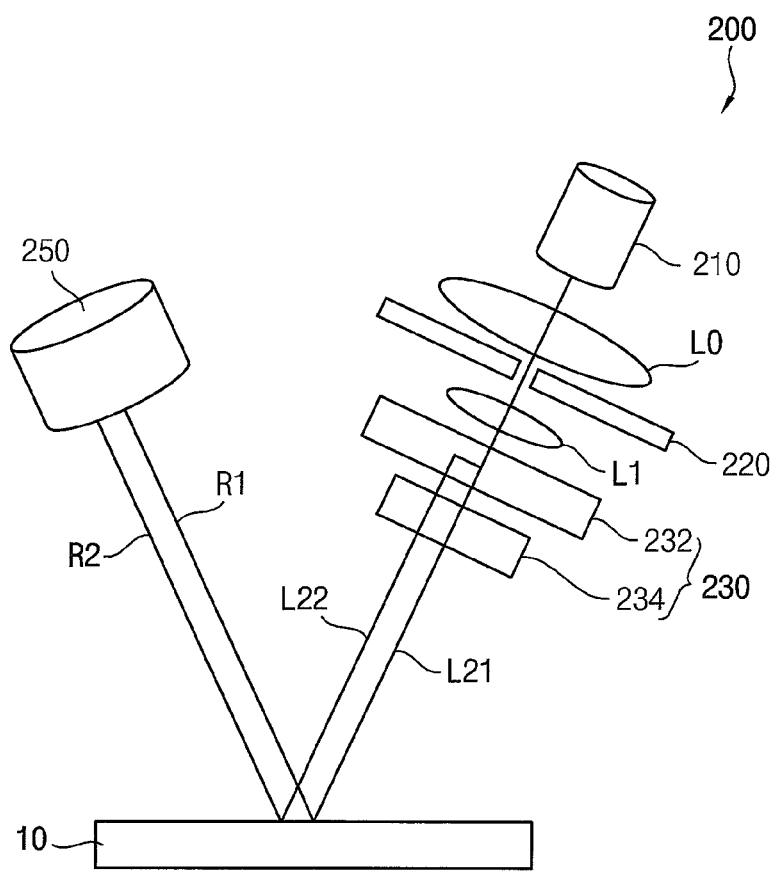

FIG. 17 is a view schematically illustrating an apparatus for measuring a flatness of an object in accordance with example embodiments.

Referring to FIG. 17, an apparatus 200 of measuring a flatness of an object in accordance with example embodiments may include a laser source 210, a filter 220, an etalon interferometer 230 and an analyzer 250.

The laser source 210 may be slantly disposed over the glass substrate 10. Thus, the laser source 210 may generate a laser L0 in a direction inclined to the upper surface of the glass substrate 10.

The filter 220 may be disposed between the laser source 210 and the glass substrate 10. The filter 220 may filter the laser L0 generated from the laser source 210 to remove noises in the laser L0. Thus, the laser L0 passing through the filter 220 may be converted into a filtered laser L1. The filter 220 may have functions substantially the same as those of the filter 120 in FIG. 1.

The etalon interferometer 230 may be disposed between the filter 220 and the glass substrate 10. The etalon interferometer 230 may convert the filtered laser L1 into a laser array L21 and L22. The etalon interferometer 230 (which may include a first etalon 232 and a second etalon 234) may have functions substantially the same as those of the etalon interferometer 130 in FIG. 1. Thus, the laser array L21 and L22 passing through the etalon interferometer 230 may be slantly incident to the upper surface of the glass substrate 10.

The analyzer 250 may be slantly disposed over the glass substrate 10. The analyzer 250 may receive a laser array R1 and R2 (e.g., reflected laser array) reflected from the upper surface of the glass substrate 10 to measure a flatness of the glass substrate 10. The analyzer 250 may have functions substantially the same as those of the analyzer 150 in FIG. 1.

Figure 18:
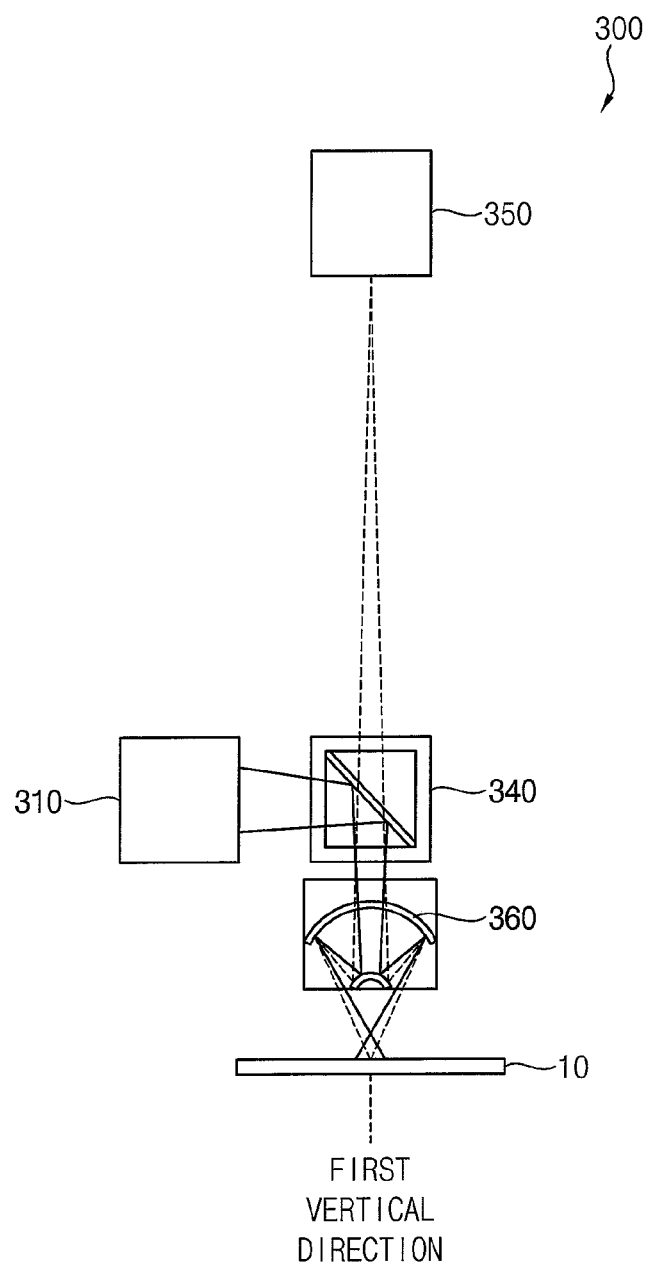

FIG. 18 is a view schematically illustrating an apparatus for measuring a flatness of an object in accordance with example embodiments.

Referring to FIG. 18, an apparatus 300 for measuring a flatness of an object in accordance with example embodiments may include a laser source 310, a beam splitter 340, an objective lens 360 and an analyzer 350.

The laser source 310 may be disposed at a region over the glass substrate 10. For example, the laser source 310 may be located at a position shifted from the first vertical direction substantially perpendicular to the upper surface of the glass substrate 10. For example, the laser source 310 may not be positioned on the first vertical direction. Particularly, the laser source 310 may be positioned on a direction substantially parallel to the upper surface of the glass substrate 10, e.g., a horizontal direction substantially perpendicular to the first vertical direction. Thus, the laser source 310 may generate a laser in the horizontal direction. As another example, the laser source 310 may be positioned on the first vertical direction over the glass substrate 10.

The beam splitter 340 may be disposed over the glass substrate 10. Particularly, the beam splitter 340 may be positioned on the first vertical direction. The laser horizontally irradiated from the laser source 310 may be downwardly induced to the upper surface of the glass substrate 10 by the beam splitter 340.

The objective lens 360 may be disposed between the beam splitter 340 and the glass substrate 10. The objective lens 360 may concentrate the laser induced by the beam splitter 340 on the upper surface of the glass substrate 10. Thus, the objective lens 360 may have a reflective function.

The analyzer 350 may be disposed over the glass substrate 10. Particularly, the analyzer 350 may be positioned on the first vertical direction. The analyzer 350 may receive a laser reflected from the upper surface of the glass substrate 10 to measure a flatness of the glass substrate 10. The analyzer 350 may have functions substantially the same as those of the analyzer 150 in FIG. 1.

According to example embodiments, a laser having a wavelength reflectable from a material of an object may be irradiated towards the object. The flatness of the object may be measured using the laser array reflected from the object. Further, the reflectivities and the stresses by the positions of the object may be measured using the laser array reflected from the object to obtain the thicknesses by the positions of the object. Particularly, the flatness and a thickness deviation may be simultaneously obtained from the stresses measured at a same position on the object, for example, a same position at which a deformation may be generated. Thus, the flatness of the object such as the glass substrate may be accurately measured to decrease process errors of a display device by correcting the flatness of the glass substrate.

The apparatus and the method in accordance with example embodiments may be applied to a glass substrate used for various electronic devices and one or more layers on the glass substrate. For example, the apparatus and the method may be applied to a cellular phone, a smart phone, a video phone, a smart pad, a smart watch, a tablet PC, a vehicle navigation, a television, a computer monitor, a notebook, a head mount display, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, including their equivalents.

What is claimed is:

1. A method of measuring a flatness of an object, the method comprising:
   converting a laser, which has a wavelength reflectable from the object, into a laser array that includes multiple beams separated from one another;
   irradiating the laser array to the object, a direction of each beam of the laser array being substantially perpendicular to a surface of the object; and
   measuring the flatness of the object using a reflected laser array reflected from the object.

2. The method of claim 1, wherein the measuring of the flatness of the object comprises:
   measuring reflectivities by positions of the object using the reflected laser array; and
   obtaining thicknesses by the positions of the object from the reflectivities.

3. The method of claim 2, wherein the measuring of the flatness of the object further comprises measuring stresses by the positions of the object using the reflected laser array.

4. The method of claim 3, further comprising comparing the stresses by the positions of the object with stresses by positions of a reference object to obtain actual stresses by the positions of the object.

5. The method of claim 1, further comprising filtering the laser before the converting of the laser into the laser array.

6. The method of claim 1, wherein the object comprises a glass substrate or at least one layer on a glass substrate.

7. An apparatus for measuring a flatness of an object, the apparatus comprising:
   a laser source disposed over the object to generate a laser having a wavelength reflectable from the object;
   an etalon interferometer disposed between the object and the laser source to convert the laser into a laser array to be irradiated to the object, a direction of each beam of the laser array being substantially perpendicular to a surface of the object; and
   an analyzer disposed over the object to measure the flatness of the object using a reflected laser array reflected from the object.

8. The apparatus of claim 7, wherein
   the laser source is disposed at a position different from a position of the object such that the laser source is disposed in a second vertical direction that is substantially parallel with a first vertical direction that passes through the object, and
   the laser source generates the laser along the second vertical direction.

9. The apparatus of claim 8, further comprising a beam splitter disposed between the etalon interferometer and the object to induce the laser array from the second vertical direction to the first vertical direction.

10. The apparatus of claim 8, wherein the analyzer is positioned in the first vertical direction.

11. The apparatus of claim 8, further comprising a filter disposed between the laser source and the etalon interferometer to filter the laser.

12. The apparatus of claim 7, wherein
   the laser source is disposed at a position inclined to a surface of the object along a first direction, and
   the analyzer is disposed at a position inclined along a second direction opposite to the first direction.

13. The apparatus of claim 7, wherein the analyzer measures reflectivities by positions of the object using the reflected laser array to obtain thicknesses by the positions of the object from the reflectivities.

14. The apparatus of claim 13, wherein the analyzer measures stresses by the positions of the object using the reflected laser array.

15. The apparatus of claim 14, wherein the analyzer compares the stresses by the positions of the object with stresses by positions of a reference object to obtain actual stresses by the positions of the object.

16. The apparatus of claim 7, wherein the analyzer comprises an optical sensor that receives the reflected laser array.

17. The apparatus of claim 7, wherein the object comprises a glass substrate or at least one layer on a glass substrate.

18. An apparatus for measuring a flatness of a substrate, the apparatus comprising:
   a laser source disposed at a position different from a position of an object such that the laser source is disposed in a second vertical direction that is substantially parallel with a first vertical direction that passes through the substrate, the laser source generating a laser, which has a wavelength reflectable from the substrate, along the second vertical direction;

an etalon interferometer disposed between the substrate and the laser source in the second vertical direction to convert the laser into a laser array;

a beam splitter disposed between the etalon interferometer and the substrate to induce the laser array from the second vertical direction to the first vertical direction; and an analyzer disposed over the substrate in the first vertical direction to receive a reflected laser array reflected from the substrate and to measure the flatness of the substrate using the reflected laser array.

19. The apparatus of claim 18, wherein the analyzer measures reflectivities and stresses by positions of the substrate using the reflected laser array to obtain thicknesses by the positions of the substrate from the reflectivities, and the analyzer compares the stresses by the positions of the substrate with stresses by positions of a reference substrate to obtain actual stresses by the positions of the substrate.

20. The method of claim 1, wherein the laser array includes an n by m array of separated beams, wherein n and m are positive integers greater than 1.

21. The method of claim 20, wherein a direction of the laser is substantially parallel to a direction of each beam of the reflected laser array.

\* \* \* \* \*